May 16, 1950 G. W. LOWRY 2,508,069
TIRE IRON WITH ANTIFRICTION BEARINGS
Filed Aug. 6, 1946.

Glenn W. Lowry
INVENTOR.

BY
Attorney

Patented May 16, 1950

2,508,069

UNITED STATES PATENT OFFICE 2,508,069

TIRE IRON WITH ANTIFRICTION BEARINGS

Glenn W. Lowry, Osborn, Ohio

Application August 6, 1946, Serial No. 688,632

1 Claim. (Cl. 157—1.1)

This invention is directed to an improvement in tire irons and particularly to a tire iron constructed to facilitate and materially reduce the effort and time in the removal of the tire from the rim.

The primary object of the present invention is to provide a tire iron which may be readily inserted between the tire and the rim, and which is provided at an appropriate portion above the entrant end with anti-friction elements, such as balls or rollers, to provide a bearing surface for the tire-portion being dislodged by leverage pressure of the iron to reduce the friction of such tire portion to facilitate, and reduce the effort of, the tire removal.

A further object of the invention is to arrange the friction elements relative to the iron proper to provide for their convenient insertion in the iron and their removal therefrom when desired.

The invention is illustrated in the accompanying drawings, in which.

Figures 1, 2, 3:
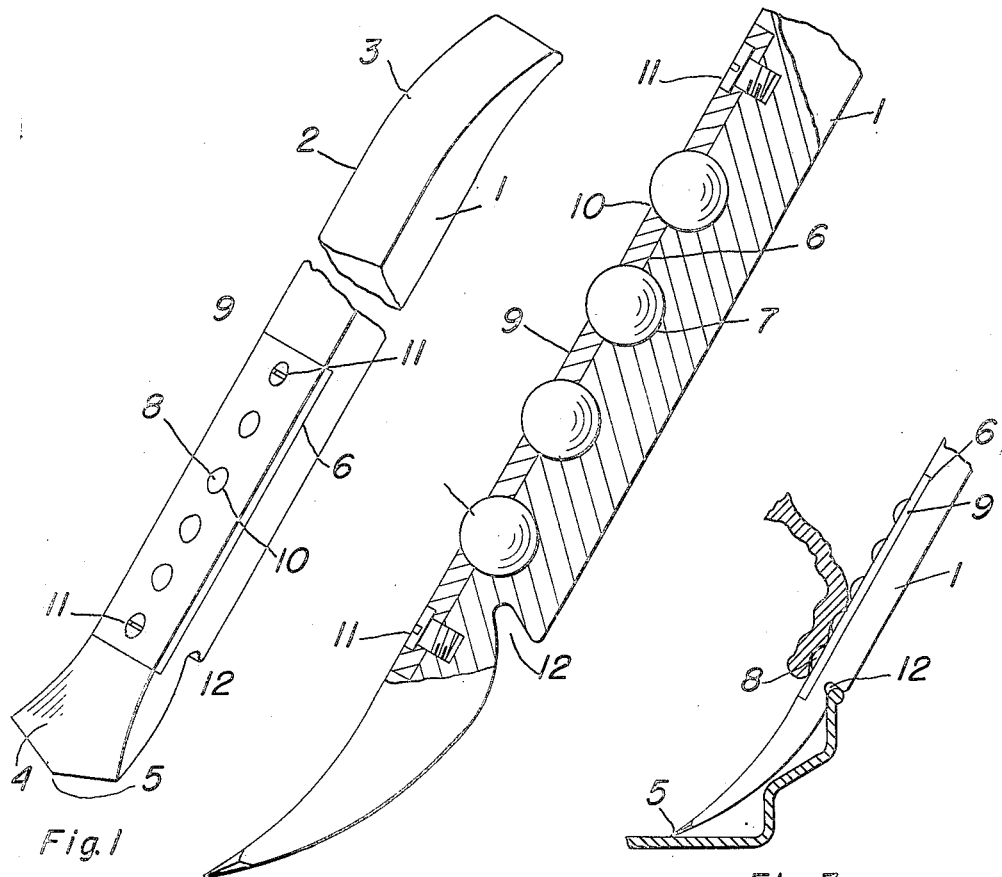
Figure 1 is a perspective view of the improved tire iron.
Figure 2 is an edge view thereof partially in cross-section to show the construction of the iron.
Figure 3 is a view showing the application of the tire iron in removing a tire from a rim.

The improved tire iron includes an appropriate length of a metal bar 1 to provide through the main length a leverage handle for use of the iron.

One end 2 of the tire iron, which is normally employed as the handle, has a slight curve 3 and is gradually reduced in thickness throughout the curved portion to terminate in a thin rounded transverse edge. The opposite or operative end 4 of the bar 1 is slightly curved in the longitudinal median line of the bar 1. The curved end 4 is tapered to terminate in a wedging edge that is inclined on a straight line from the sides of the curved portion to a centrally positioned point 5.

Figures 4, 5:
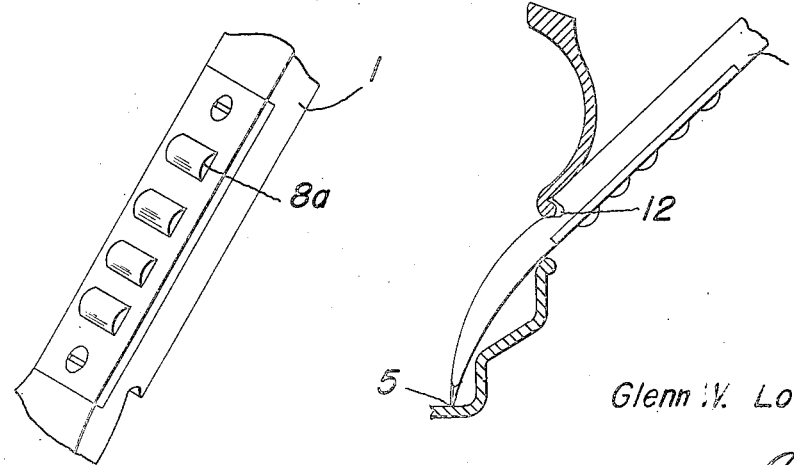
Figure 4 is a fragmentary perspective view of a modification.
Figure 5 is a view showing use of the iron when applying a tire to a rim.

That surface of the bar immediately beyond the curved portion 4 is cut away throughout the full width of the bar to provide a recess 6. The recessed portion 6 is provided with sockets 7 to receive support anti-friction elements which may comprise either balls 8, as shown in Fig. 1, or rollers 8a, as shown in Fig. 4. The anti-friction elements are held in place by a plate 9 formed with openings 10 to respectively surround the anti-friction elements but to expose a minor portion of their peripheries. The openings 10 in the plate 9 and the sockets 7 in the recess 6 are arranged to coincide and to surround the major portions of the elements and prevent their separation from the bar. The plate 9 is secured by lag screws 11, to removably secure the plate in place to provide for convenient insertion or removal of the friction elements when necessary.

The surface of the bar opposite the friction elements is formed with a deep transverse notch or groove 12 shaped and sized to fit over the end of the tire rim and provide a fulcrum for the tire iron in operation.

In the use of the improved tire iron, the gradually tapered end 4 is forced down between the tire rim and tire as is usual in the use of tire irons. The iron is forced into position to cause the notch or depression 12 to engage and straddle the edge of the tire rim and serve as a fulcrum for the displacing movement of the tire iron. The iron is forced at an angle to the tire rim through the use of the handle portion, tending to displace the tire from the rim and raise it above the latter so that subsequent and continuous displacement may entirely free the tire. As the tire portion with which the improved iron is in direct contact is forced upwardly or outwardly from the tire rim, the displaced portion of the tire, overlying the bar, will ride on the anti-friction elements 8 and will, thereafter, as the displacing movement continues, move quite freely and with practically no friction check until that portion of the tire is entirely separated from the rim.

The improved iron is, of course, to be made of any appropriate material and in any desired size or proportions restricted only in that the anti-friction elements are substantially enclosed within and supported bodily by the bar, and, preferably, are removably secured to the iron and may be removed and replaced at will and may be of any desired character such as balls, rollers, or the like, to furnish an anti-friction base for the tire as it is displaced. This, obviously, materially reduces the effort required to be applied to the tire iron in separating the tire and avoids any possible wear or strain on the tire portion incident to any parts of the rim with which it might otherwise contact.

Obviously, the iron can be used to conveniently apply a casing to a rim, for instance as shown in Figure 5. By reversing the iron, the anti-friction elements ride over the rim edge flange while the groove 12 engages the flange of the casing, and by inward force on the iron the tire casing is conveniently forced over the rim. The iron can be readily withdrawn, the anti-friction elements greatly reducing the friction between the iron and the casing and the rim.

What I claim as new is:

A tire iron comprising a bar having an end for wedging between a rim and a tire mounted thereon, said end being tapered and curved outwardly, a series of projecting anti-friction elements mounted in recesses formed in the bar above the outwardly curved tapered end portion and on that side of the bar which presents the concave side of the curved end portion and a groove formed on the opposite side of the bar and directed inwardly of the curved tapered end portion of said bar to serve as a fulcrum in connection with the rim in tire displacing operation of the iron.

GLENN W. LOWRY.

REFERENCES CITED

The following references are of record in the file of this patent:

UNITED STATES PATENTS

| Number | Name | Date |
|---|---|---|
| 597,286 | Horswill | Jan. 11, 1898 |
| 962,502 | Elmborg | June 28, 1910 |
| 1,385,948 | Norlund | July 26, 1921 |
| 1,530,313 | Fischer | Mar. 17, 1925 |
| 2,311,789 | Taylor | Feb. 23, 1943 |

FOREIGN PATENTS

| Number | Country | Date |
|---|---|---|
| 184,705 | Great Britain | Aug. 24, 1922 |